Jan. 14, 1936.   W. J. BRETH ET AL   2,027,854
TUBE SPLICER
Filed Nov. 14, 1934   3 Sheets-Sheet 1
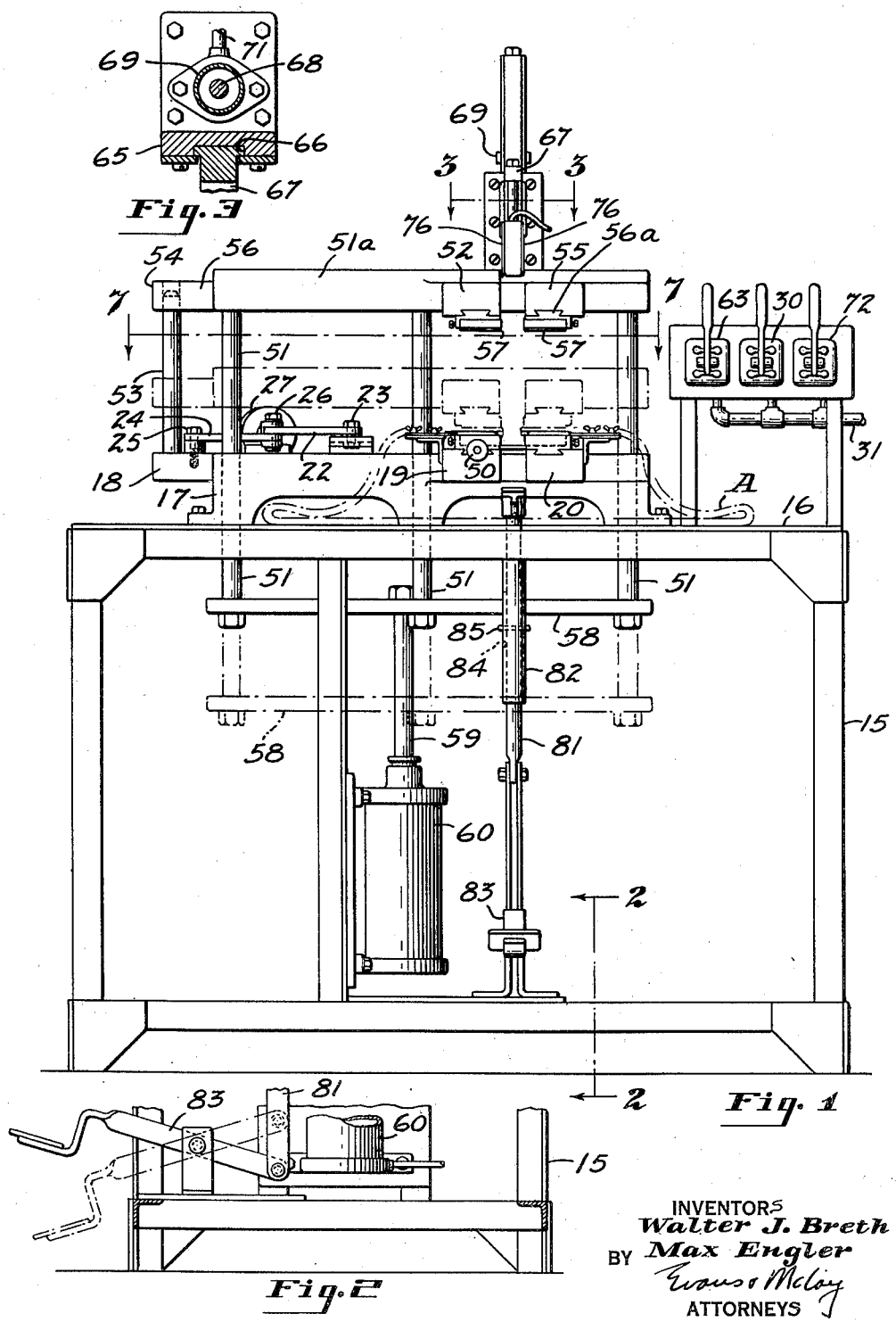
INVENTORS
Walter J. Breth
BY Max Engler
ATTORNEYS

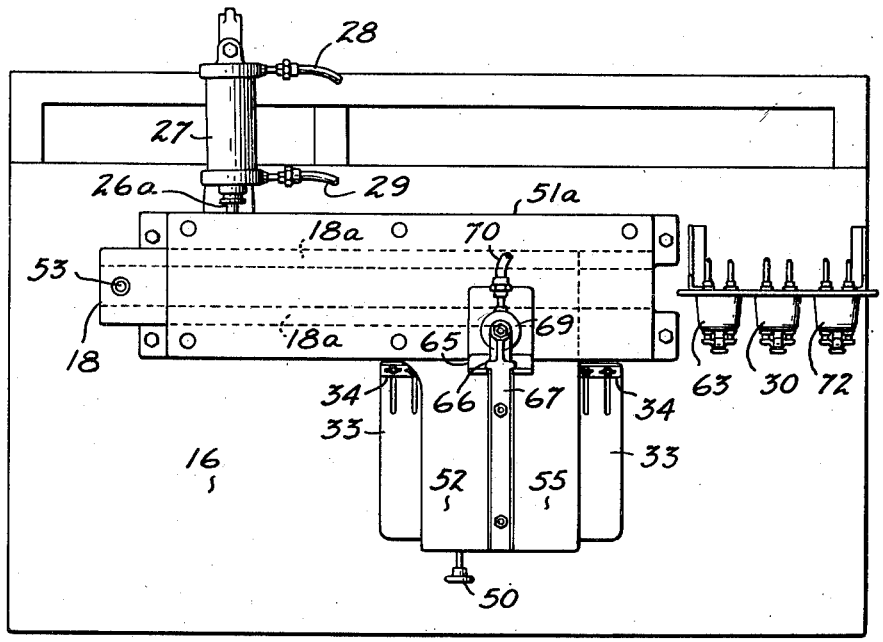
Fig. 4
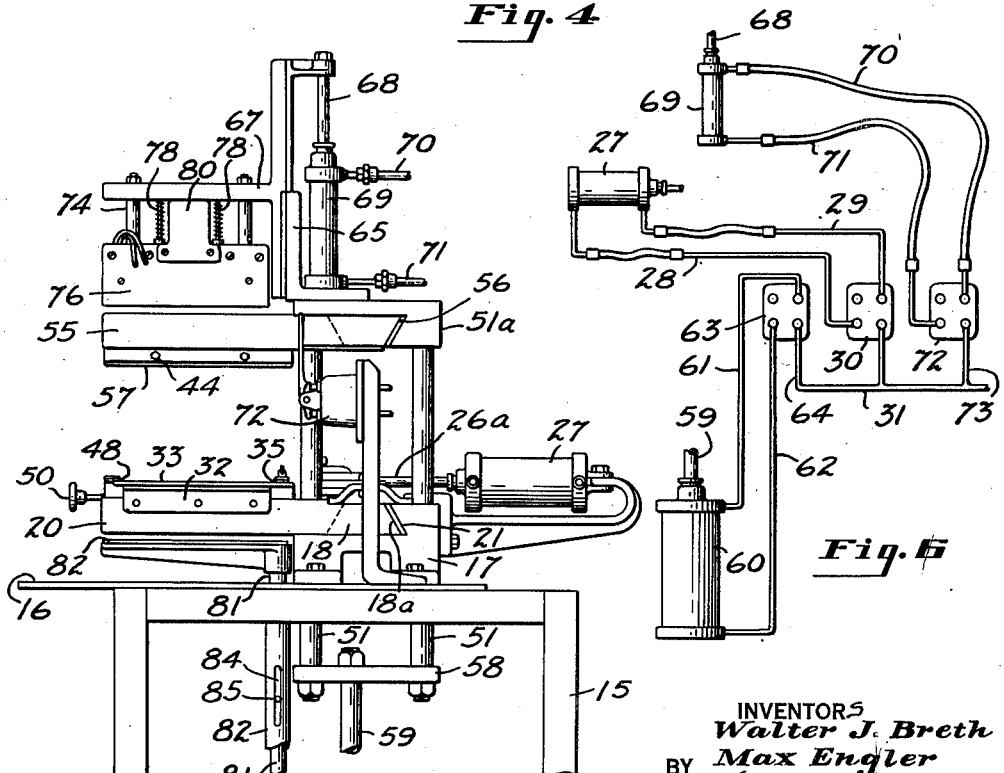
Fig. 6
Fig. 5
INVENTORS
Walter J. Breth
Max Engler
BY Evans & McCoy
ATTORNEYS Jan. 14, 1936. W. J. BRETH ET AL 2,027,854
TUBE SPLICER
Filed Nov. 14, 1934 3 Sheets-Sheet 3
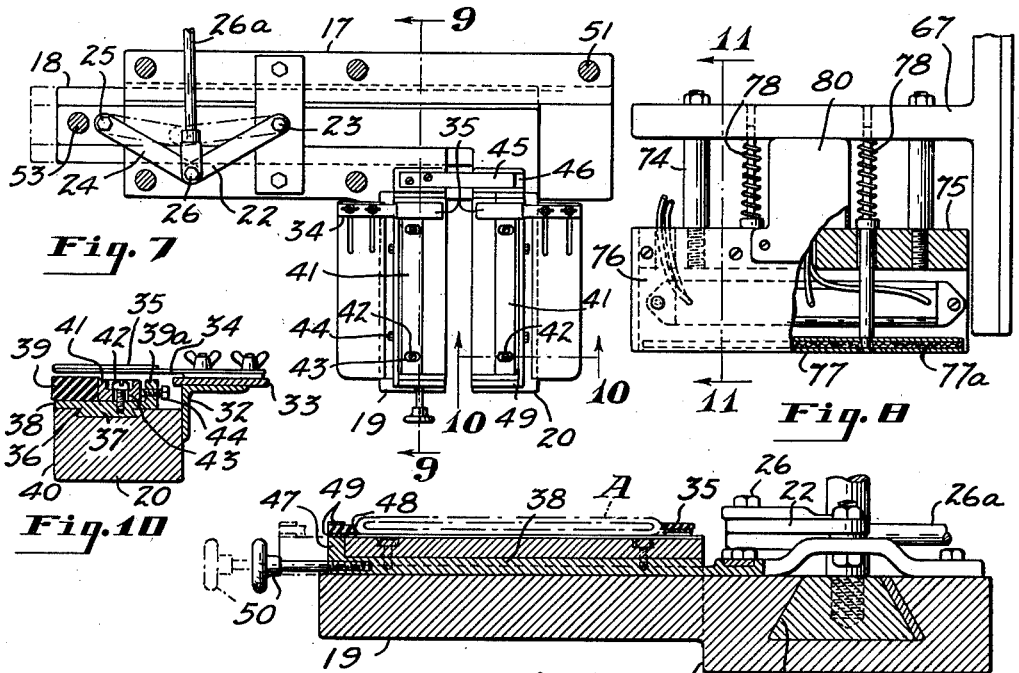
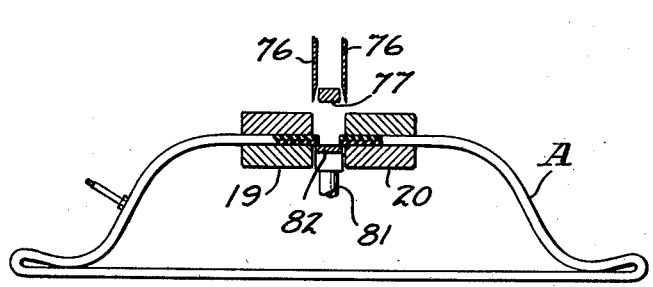
Fig.12
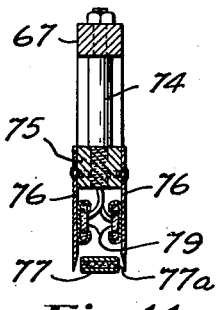
Fig.11
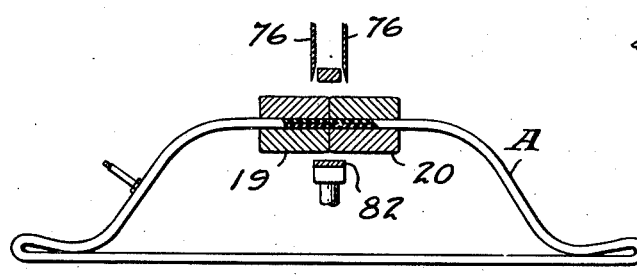
Fig.14
Fig.13
INVENTORS
Walter J. Breth
Max Engler
BY Evans + McCoy
ATTORNEYS Patented Jan. 14, 1936

2,027,854

UNITED STATES PATENT OFFICE 2,027,854

TUBE SPLICER

Walter J. Breth and Max Engler, Akron, Ohio, assignors to The General Tire & Rubber Company, Akron, Ohio, a corporation of Ohio Application November 14, 1934, Serial No. 753,014

14 Claims. (Cl. 154—9)

This invention relates to apparatus for use in the manufacture of tubes for pneumatic tires and the like, and more particularly to tube splicing apparatus.

The primary object of the present invention is to provide new and improved apparatus by means of which tubes for pneumatic tires and the like can be easily and more efficiently spliced.

Another object is to provide a tube splicing apparatus which is adapted for splicing tubes of various sizes.

With the above and other objects in view, the present invention consists of certain features of construction and combinations of parts to be hereinafter described with reference to the accompanying drawings, and then claimed.

In the drawings which illustrate a suitable embodiment of the invention,

Figure 1 is a front elevation of the tube splicing apparatus;

Fig. 2 is a section taken approximately on line 2—2 of Fig. 1;

Fig. 3 is a horizontal section taken approximately on line 3—3 of Fig. 1;

Fig. 4 is a plan view of the apparatus shown in Fig. 1;

Fig. 5 is a partial side elevation of the apparatus shown in Fig. 1;

Fig. 6 is a diagrammatic view of the control apparatus for the tube splicing apparatus;

Fig. 7 is a section taken on line 7—7 of Fig. 1;

Fig. 8 is a fragmentary view of the knife holder and knives.

Fig. 9 is an enlarged section taken approximately on line 9—9 of Fig. 7;

Fig. 10 is an enlarged section taken approximately on line 10—10 of Fig. 7;

Fig. 11 is a section taken approximately on line 11—11 of Fig. 8 showing the holder and cutting knives;

Fig. 12 is a diagrammatic view showing the arrangement of the clamping blocks and cutter just prior to the cutting operation;

Fig. 13 is a diagrammatic view showing the arrangement of the parts during the cutting operation; and Fig. 14 is a diagrammatic view showing the arrangement of the clamping parts after the cutting operation and at the time the cut ends of the tube are brought into engagement with each other.

Referring to the accompanying drawings in which like numerals refer to like parts throughout the several views, the apparatus is supported upon a suitable framework 15 having a table 16 thereon.

Mounted upon the table 16 is a base member 17 having a block 19 extending at right angles from one side thereof, the base member 17 having a guideway 21 extending longitudinally thereof. This guideway 21 slidably receives slide member 18 having a dovetailed guide face 18a and a block 20 extending at right angles from one end thereof parallel to the block 19. The slide member 18 is rendered movable in the guideway 21 by means of a toggle linkage comprising a link 22 pivoted at one end at 23 to base member 17 and a link 24 pivoted at one end at 25 to slide member 18, the opposite ends of the links 22 and 24 being pivotally connected by a pivot pin 26 to which a yoked rod 26a is pivotally connected. The rod 26a is provided with a plunger which is actuated from within a fluid pressure chamber 27 having fluid connections 28 and 29 with a control valve 30, the control valve 30 being connected into a pressure line 31.

Each of the blocks 19 and 20 is provided with a flanged member 32 at its outer side which supports a tube supporting plate 33 that projects slightly over the block, and mounted at the rearward end of the plate 33 is a guide strip 34 having an adjustment longitudinally of the plate. The guide strips 34 of the two blocks are aligned with each other and preferably provided with a layer 35 of rubber vulcanized thereto as shown in Figs. 9 and 10.

Each of the blocks 19 and 20 is provided with a longitudinally extending guideway 36 which slidably receives a dove-tailed guide 37 of a plate member 38 having an upstanding flange 39a as shown in Fig. 10.

Vulcanized or otherwise secured to the top surface of each plate member 38 is a longitudinally extending gripper block or jaw 39 of rubber, one side face of which extends slightly beyond the inner face 40 of the block to which it is secured. A bar 41 is secured to the plate member 38 between the rubber jaw 39 and plate flange 39a by means of cap screws 42 which extend through enlarged openings 43 provided in the bar 41. Screws 44 are provided in the flange 39a to engage with the bar 41, and by loosening the screws 42 and adjusting the screws 44 the rubber jaw 39 may be distorted laterally sufficiently to cause its inner side face to be properly positioned beyond the inner side face 40 of the blocks.

One of the plate members 38 is provided with a transversely extending rectangular shaped bar 45 which is received with a sliding fit in a guide recess 46 provided in the other plate member 38. Also each plate member 38 is provided at its outer end with an upstanding flange 47 to which a rubber guide strip 48 is secured and arranged parallel to guide strip 34. These guide strips 48 are spaced by a spacer 49 from flange 47, as shown in Fig. 9.

As shown in Fig. 9, one of the plate members 38 is provided with a pull handle 50, which when actuated, simultaneously slides the plate members 38 by reason of bar 45 relative to the blocks 19 and 20. This movement of the plate members adjusts the distance between the guide strips 48 and 34 to accommodate tubes of different widths. It will be noted that by reason of this means any desired degree of adjustment may be obtained.

Extending upwardly through the base member 17 are a plurality of rods 51 which support a member 51a having a block 52 disposed parallel to and directly over block 19. Also extending upwardly from member 18 is a fixed rod 53 which receives with a vertical sliding fit a slide member 54 corresponding to slide member 18, and which also has a block 55 extending over block 20 in parallel relation, as shown in Figs. 1 and 5. The slide member 54 is slidably mounted in member 51a by means of dove-tailed guide faces 56.

Each of the blocks 52 and 55 is provided with plate members 56a to which rubber blocks or tube gripping jaws 57 are mounted preferably in the same manner in which the rubber jaws 39 are mounted on the lower plates 38.

The rods 51 which slidably extend through base member 17 are interconnected below base member 17 by means of a cross head 58 to which a reciprocable plunger rod 59 is connected.

The plunger rod 59 operates within a fluid pressure cylinder 60 which is provided with fluid connections 61 and 62 at its opposite ends that lead to a fluid control valve 63, the valve 63 having a connection 64 which leads to the fluid pressure line 31. Reciprocation of the plunger rod 59 will, of course, raise and lower the members 51a and 54 and the gripper jaws 57 carried thereby.

Mounted upon the upper member 51a is an upstanding bracket 65 having vertical guideways 66 therein, which slidably receive a reciprocable arm 67 to which a plunger rod 68 is connected. The rod 68 operates within a stationary fluid pressure cylinder 69, the opposite ends of which have fluid connections 70 and 71 leading to a fluid control valve 72, the valve 72 having a connection 73 leading to the fluid pressure line 31.

The arm 67 is provided with depending elements 74 which support a block 75 at their lower ends to which a pair of spaced cutters or knives 76 are secured. Mounted between the knives 76 is a slidable stripper bar 77 which is resiliently urged to its lowermost position by compression springs 78. The knives 76 are heated by means of resistance elements 79 connected through a thermostat control device 80 to a source of current. The stripper bar 77 is insulated by means of a pad 77a of asbestos or other suitable material to prevent the transmission of heat from the elements 79 to the supported tube.

The thermostat control device 80 serves to maintain the cutting knives 76 at the most efficient temperature.

It will be noted that the cutter knives 76 are of substantially the same length as the rubber tube gripping jaws 39 and 57, and the knife 76 at the left as viewed in Figs. 1 and 12, is substantially in the plane of the inner faces of the jaws at the left.

Mounted to extend through the table 16 is a plunger rod 81 having a pad 82 at its upper end, which is preferably covered with a resilient facing of a width corresponding to the distance between the knives 76. The rod 81 is guided for reciprocation in a sleeve 82 carried by the table 16 and is actuated by a foot treadle 83 pivotally mounted at the lower portion of the frame-work 15. The sleeve is provided with an elongated slot 84 and the rod 81 carries a pin 85 which slides in slot 84 and prevents rotation of the rod 81.

In the operation of the apparatus, the ends of the uncured tube A are positioned over the plates 33 and over the lower gripping jaws 39 which are spaced apart as shown in Fig. 1, and with the ends of the tube lying in spaced relation slightly inwardly of the jaw side faces. The plates 38 are then moved in their supporting blocks by grasping the handle member 50, so as to engage the guide strips 34 and 48 with the sides of the tube A to align the ends of the tube A with each other.

The operator then operates control valve 63 which retracts plunger rod 59 and draws members 51a and 58 downwardly until the ends of the tube are securely clamped between the upper and lower jaws 57 and 39, as shown diagrammatically in Fig. 12. The foot treadle 83 is then depressed to raise the pad 82 to a position snugly between the lower jaws 39 and engaging the under sides of the projecting tube ends as shown in Fig. 12.

The upper face of the tube in its supported position lies above the guide strips 34 and 48, so these strips will not interfere with the clamping of the tube ends.

The operator next actuates control valve 72 to cause a downward travel of the arm 67. During the downward travel of arm 67 the cutter knives 76 pass between the rubber jaws as shown in Fig. 13 with a close fit and shear off the projecting ends of the tube, the stripper plate 77, during shearing operation, gripping these ends, so that clean cut edges are provided. The control valve 72 is again actuated to raise the cutter blades from between the rubber clamping jaws.

Since the cutter knives are heated, the tackiness of the severed end faces of the uncured tube will be increased as is well known in the art. Immediately after the knives are raised, the pressure is removed from the foot treadle to drop the pad 82 from between the jaws 39, and the control valve 30 is actuated. Since the base member 17 and the upper member are held against movement relative to each other by means of the rods 51, and since the slidable members 18 and 54 are held against movement relative to each other by means of rods 53, the proper actuation of the control valve 30 will cause the plunger rod 26a to move members 18 and 54 in unison relative to members 17 and 51a and cause the jaws 39 and 57 at the right as viewed in Fig. 1, to move toward the other jaws 39 and 57, respectively. This brings the clean cut ends of the tube A to be brought into aligned contact with each other, as shown diagrammatically in Fig. 14. These ends, because of their tackiness, will then adhere to each other as is well known when they are brought into close engagement by the jaws 39 and 57.

Since the clamping jaws are of rubber or other suitable resilient material, they will give a sufficient amount to permit the clean cut edges of the tube ends to be brought into a firm adhering engagement with each other so that the adhering tacky edges will form a closed container which will hold air during the subsequent vulcanizing operation.

After this, the control valves 63 and 30 are actuated to restore the jaws 39 and 57 to their initial positions, that is, the positions indicated in Figure 1.

The tube A is then removed for vulcanization in a suitable vulcanizing apparatus.

The tube, as is well known in the art, after it is formed, contains some such material as soapstone so that during the operation of clamping the ends of the tube and the shearing of the same, this material will prevent the cut edges at each end from adhering to each other.

Furthermore, it is to be understood that the particular form of apparatus shown and described, and the particular procedure set forth, are presented for purposes of explanation and illustration and that various modifications of said apparatus and procedure can be made without departing from our invention as defined in the appended claims.

What we claim is:

1. In an apparatus for splicing tubes, a pair of spaced tube end supporting members, each disposed to support an end of a tube with a portion of the end projecting beyond the same, means for moving one of said members transversely relative to the other to align the ends of the tube with each other, a pair of spaced clamping members, means for moving said clamping members toward said supporting members to clamp the supported ends of the tube against said supporting members, means for severing the projecting ends of the tube, and means for moving the members which clamp one end of the tube toward the other members to bring the ends of the tube into engagement with each other.

2. In an apparatus for splicing tubes, a pair of spaced tube end supporting members, each disposed to support an end of a tube with a portion of the end projecting beyond the same, means for moving one of said members transversely relative to the other to align the ends of the tube with each other, a pair of spaced clamping members, means for moving said clamping members toward said supporting members to clamp the supported ends of the tube against said supporting members, means for severing the projecting ends of the tube, and means for moving the members which clamp one end of the tube toward the other members to bring the ends of the tube into engagement with each other, each of said supporting and clamping members being of a resilient material.

3. In an apparatus for splicing tubes, a pair of spaced tube end supporting members, each disposed to support an end of a tube with a portion of the end projecting beyond the same, means for moving one of said members transversely relative to the other to align the ends of the tube with each other, a pair of spaced clamping members, means for moving said clamping members toward said supporting members to clamp the supported ends of the tube against said supporting members, means for severing the projecting ends of the tube, and means for moving the members which clamp one end of the tube toward the other members to bring the ends of the tube into engagement with each other, each of said supporting and clamping members being of rubber.

4. In an apparatus for splicing tubes, a pair of spaced tube end supporting members, each disposed to support an end of a tube with a portion of the end projecting beyond the same, means for moving one of said members transversely relative to the other to align the ends of the tube with each other, a pair of spaced clamping members, means for moving said clamping members toward said supporting members to clamp the supported ends of the tube against said supporting members, a pair of spaced cutting knives, means for moving said knives between said clamping members to sever the projecting ends of the tube, and means for moving the members which clamp one end of the tube toward the other members to bring the ends of the tube into engagement with each other.

5. In an apparatus for splicing tubes, a pair of spaced tube end supporting members, each disposed to support an end of a tube with the end projecting beyond the same, a pair of aligned guides, a second pair of aligned guides on said members spaced from the first pair, each guide of one pair being movable toward the corresponding guide of the other pair to adjust the space therebetween to a predetermined width corresponding to the width of the tube to be spliced, a pair of spaced tube clamping members disposed above and in alignment with said supporting members, means for moving said clamping members toward said supporting members to clamp the tube ends, means for severing the projecting tube ends, and means for moving the members which clamp one end of the tube towards the other members to bring the ends of the tube into engagement with each other.

6. In an apparatus for splicing tubes, a pair of spaced tube end supporting members, each disposed to support an end of a tube with the end projecting beyond the same, a pair of aligned guides, a second pair of aligned guides on said members spaced from the first pair, each guide of one pair being movable toward the corresponding guide of the other pair to adjust the space therebetween to a predetermined width corresponding to the width of the tube to be spliced, a pair of spaced tube clamping members disposed above and in alignment with said supporting members, means for moving said clamping members toward said supporting members to clamp the tube ends, means for severing the projecting tube ends, and means for moving the members which clamp one end of the tube towards the other members to bring the ends of the tube into engagement with each other, each of said guides having a tube engaging portion of rubber.

7. In an apparatus for splicing tubes, a fixed lower member, an upper member movable towards said lower member, arms extending from said members in parallel superposed relation, a lower member longitudinally slidably mounted in said fixed member, an upper member longitudinally mounted in said upper member, said last mentioned members having arms extending therefrom in superposed parallel relation in alignment with the first mentioned arms, resilient tube clamping elements mounted on said arms, means for moving the first mentioned upper member towards said fixed lower member, and a common means for sliding said slidable members relative to the first mentioned lower and upper members to move the last mentioned arms substantially into engagement with the first mentioned arms.

8. In an apparatus for splicing tubes, a fixed lower member, an upper member movable towards said lower member, arms extending from said members in parallel superposed relation, a lower member longitudinally slidably mounted in said fixed member, an upper member longitudinally mounted in said upper member, said last mentioned members having arms extending therefrom in superposed parallel relation in alignment with the first mentioned arms, resilient tube clamping elements of rubber mounted on said arms, means for moving the first mentioned upper member towards said fixed lower member, and a common means for sliding said slidable members relative to the first mentioned lower and upper members to move the last mentioned arms substantially into engagement with the first mentioned arms.

9. In an apparatus for splicing tubes, a fixed lower member, an upper member movable towards said lower member, arms extending from said members in parallel superposed relation, a lower member longitudinally slidably mounted in said fixed member, an upper member longitudinally mounted in said upper member, said last mentioned members having arms extending therefrom in superposed parallel relation in alignment with the first mentioned arms, resilient tube clamping elements mounted on said arms, means for moving the first mentioned upper member towards said fixed lower member, spaced cutting knives movable between the pairs of superposed arms, and a common means for sliding said slidable members relative to the first mentioned lower and upper members to move the last mentioned arms substantially into engagement with the first mentioned arms.

10. In an apparatus for splicing tubes, a fixed lower member, an upper member movable towards said lower member, arms extending from said members in parallel superposed relation, a lower member longitudinally slidably mounted in said fixed member, an upper member longitudinally mounted in said upper member, said last mentioned members having arms extending therefrom in superposed parallel relation in alignment with the first mentioned arms, resilient tube clamping elements mounted on said arms, a pair of aligned guides, one being mounted on one lower arm and the other being mounted on the other lower arm, both guides extending above the clamping elements carried by the lower arms, other aligned guides arranged parallel to said first guides, means to move said other guides relative to the first guides to adjust the spacing therebetween, means for moving the first mentioned upper member towards said fixed lower member, and a common means for sliding said slidable members relative to the first mentioned lower and upper members to move the last mentioned arms substantially into engagement with the first mentioned arms.

11. In an apparatus for splicing tubes, a pair of spaced tube end supporting members, each disposed to support an end of a tube with a portion of the end projecting beyond the same, means for moving one of said members relative to the other to align the ends of the tube with each other, a pair of spaced clamping members, means for moving said clamping members toward said supporting members to clamp the supported ends of the tube against said supporting members, a pad member movable between said supporting members to support the projecting tube ends, means for moving said pad member between said supporting members into tube end supporting position, cutting means movable between said clamping members to sever the projecting tube ends, said pad member supporting the tube ends during the severing thereof, and means for moving the supporting and clamping members which clamp one end of the tube toward the other members to bring the ends of the tube into abutting engagement with each other.

12. In an apparatus for splicing tubes, a pair of spaced tube end supporting members, each disposed to support an end of a tube with a portion of the end projecting beyond the same, means for moving one of said members relative to the other to align the ends of the tube with each other, a pair of spaced clamping members, means for moving said clamping members toward said supporting members to clamp the supported ends of the tube against said supporting members, a pad member movable between said supporting members to support the projecting tube ends, means for moving said pad member between said supporting members into tube end supporting position, cutting means movable between said clamping members to sever the projecting tube ends, said pad member supporting the tube ends during the severing thereof, and means for moving the supporting and clamping members which clamp one end of the tube toward the other members to bring the ends of the tube into abutting engagement with each other, said pad member having a resilient tube end engaging surface.

13. In an apparatus for splicing tubes, a pair of spaced tube end supporting members, each disposed to support an end of a tube with a portion of the end projecting beyond the same, means for moving one of said members relative to the other to align the ends of the tube with each other, a pair of spaced clamping members, means for moving said clamping members toward said supporting members to clamp the supported ends of the tube against said supporting members, a pad member movable between said supporting members to support the projecting tube ends, means for moving said pad member between said supporting members into tube end supporting position, cutting means movable between said clamping members to sever the projecting tube ends, said pad member supporting the tube ends during the severing thereof, and means for moving the supporting and clamping members which clamp one end of the tube toward the other members to bring the ends of the tube into abutting engagement with each other, said cutting means comprising spaced heated cutter knives.

14. In an apparatus for splicing tubes, a pair of spaced tube end supporting members, each disposed to support an end of a tube with a portion of the end projecting beyond the same, means for moving one of said members relative to the other to align the ends of the tube with each other, a pair of spaced clamping members, means for moving said clamping members toward said supporting members to clamp the supported ends of the tube against said supporting members, a pad member movable between said supporting members to support the projecting tube ends, means for moving said pad member between said supporting members into tube end supporting position, cutting means movable between said clamping members to sever the projecting tube ends, said pad member supporting the tube ends during the severing thereof, and means for moving the supporting and clamping members which clamp one end of the tube toward the other members to bring the ends of the tube into abutting engagement with each other, said cutting means comprising spaced heated cutter knives, and said pad member being arranged to be spaced from said tube end supporting members to permit the passage of said knives between said pad and supporting members.

WALTER J. BRETH.
MAX ENGLER.